(12) United States Patent
Zhang

(10) Patent No.: US 10,845,964 B2
(45) Date of Patent: Nov. 24, 2020

(54) GROUP CHAT SELECTION AND DISPLAY METHOD, AND DEVICE THEREOF

(71) Applicant: ADVANCED NEW TECHNOLOGIES CO., LTD., George Town (KY)

(72) Inventor: Lei Zhang, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

(21) Appl. No.: 15/662,154

(22) Filed: Jul. 27, 2017

(65) Prior Publication Data
US 2017/0322693 A1 Nov. 9, 2017

Related U.S. Application Data

(63) Continuation of application No. PCT/CN2016/071548, filed on Jan. 21, 2016.

(30) Foreign Application Priority Data

Jan. 28, 2015 (CN) .......................... 2015 1 0044129

(51) Int. Cl.
*G06F 9/48* (2006.01)
*G06F 3/0484* (2013.01)
(Continued)

(52) U.S. Cl.
CPC .......... *G06F 3/0484* (2013.01); *G06F 3/0482* (2013.01); *G06F 3/0488* (2013.01);
(Continued)

(58) Field of Classification Search
CPC .... G06F 3/0484; G06F 3/0482; G06F 3/0488; H04L 12/1827; H04L 51/04; H04L 12/1822
See application file for complete search history.

(56) References Cited

U.S. PATENT DOCUMENTS

| 5,880,731 A | * | 3/1999 | Liles | ...................... G06F 3/0481 345/473 |
| 6,512,527 B1 | * | 1/2003 | Barber | ................... B64D 43/00 340/945 |

(Continued)

FOREIGN PATENT DOCUMENTS

| CN | 101388853 A | 3/2009 |
| CN | 102546454 A | 7/2012 |

(Continued)

OTHER PUBLICATIONS

Extended European Search Report in European Application No. 16742684.0-1216/3252591 (PCT/CN2016071548) pursuant to Rule 62 EPC, the supplementary European search report (Art. 153(7) EPC) and the European Search Opinion, dated Jan. 25, 2018.

(Continued)

*Primary Examiner* — Jennifer N To
*Assistant Examiner* — Kuang C Chen
(74) *Attorney, Agent, or Firm* — Finnegan, Henderson, Farabow, Garrett & Dunner, LLP

(57) ABSTRACT

Embodiments of the present disclosure provide a group chat method and device, applied to a terminal. The method includes: outputting a selection interface to a user through a group chat interface, where the selection interface is used for prompting the user to select, in the group chat interface, a group chat message of a target group member; acquiring a group member ID of the group chat message selected by the user through the selection interface; and displaying, in a preset manner in the group chat interface, group chat messages corresponding to the group member ID. The present application can highlight, in the group chat interface during a group chat, the group chat messages of the target group member selected by the user, which can improve group chat experience of the user.

13 Claims, 6 Drawing Sheets

(51) Int. Cl.
*G06F 3/0488* (2013.01)
*H04L 12/18* (2006.01)
*H04L 12/58* (2006.01)
*G06F 3/0482* (2013.01)

(52) U.S. Cl.
CPC .......... *H04L 12/1827* (2013.01); *H04L 51/04* (2013.01); *H04L 12/1822* (2013.01)

(56) References Cited

U.S. PATENT DOCUMENTS

| | | | |
|---|---|---|---|
| 6,515,681 B1 * | 2/2003 | Knight | G06Q 10/107 707/999.003 |
| 8,676,913 B1 | 3/2014 | Roche et al. | |
| 2002/0054106 A1 * | 5/2002 | Mugura | G06F 3/0236 715/764 |
| 2010/0083135 A1 | 4/2010 | Zawacki et al. | |
| 2011/0010641 A1 * | 1/2011 | Wolff | G06Q 10/107 715/753 |
| 2013/0298006 A1 | 11/2013 | Good et al. | |
| 2014/0068468 A1 * | 3/2014 | Yoon | H04L 65/403 715/758 |
| 2015/0046838 A1 * | 2/2015 | Sano | G06Q 50/01 715/752 |

FOREIGN PATENT DOCUMENTS

| | | |
|---|---|---|
| CN | 102779122 A | 11/2012 |
| CN | 102932238 A | 2/2013 |
| CN | 103269303 A | 8/2013 |
| CN | 103279699 A | 9/2013 |
| CN | 103544293 A | 1/2014 |
| CN | 104579902 A | 4/2015 |
| CN | 107193937 A | 9/2017 |
| JP | 2017510893 A | 4/2017 |
| WO | WO 2012/102868 A1 | 8/2012 |
| WO | WO-2014/176748 A1 | 11/2014 |
| WO | WO 2016/119622 A1 | 8/2016 |

OTHER PUBLICATIONS

First Chinese Search Report dated Jul. 18, 2018, issued by the State Intellectual Property Office of the People's Republic of China in counterpart Chinese Patent Application No. 201510044129.7 (2 pages).

First Office Action dated Jul. 27, 2018, issued by the State Intellectual Property Office of the People's Republic of China in counterpart Chinese Patent Application No. 201510044129.7 (13 pages).

PCT International Search Report and Written Opinion dated Apr. 25, 2016, issued in corresponding International Application No. PCT/CN2016/071548 (13 pages).

Written Opinion issued from The Singapore Patent Office in corresponding Singapore Application No. 10201906518T dated Apr. 21, 2020 (5 pgs.).

Office Action issued from The Japanese Patent Office in corresponding Japanese Application No. 2017-539443, dated Nov. 21, 2019 (6 pgs.).

\* cited by examiner

GROUP CHAT SELECTION AND DISPLAY METHOD, AND DEVICE THEREOF

CROSS REFERENCE TO RELATED APPLICATION

The disclosure claims the benefits of priority to International Application No. PCT/CN2016/071548, filed on Jan. 21, 2016, which claims the benefits of priority to Chinese Application No. 201510044129.7, filed Jan. 28, 2015, both of which are incorporated herein in their entireties.

TECHNICAL FIELD

The present application relates to the field of communications, and in particular, to a group chat method and device.

BACKGROUND

With the development of Internet technologies, popularization of instant messaging technologies brings various conveniences to work and life of ordinary users. Currently, most instant messaging software (such as Alitalk and MiTalk) supports a group chat function. A group chat may allow some users who are concerned about a common topic to gather together to exchange and share information.

However, a feature of a group chat application is that a lot of users need to participate in a common topic and event. Therefore, in a user group with a lot of group members or a user group with many active group members, a large quantity of group chat messages may be generated. As a result, in a group chat among users, rapid generation of group chat messages may make it inconvenient for the users to view the messages.

SUMMARY

Accordingly, the present application provides a group chat method, including: outputting a selection interface to a user through a group chat interface, where the selection interface is used for prompting the user to select, in the group chat interface, a group chat message of a target group member; acquiring a group member identification (ID) of the group chat message selected by the user through the selection interface; and displaying, in a preset manner in the group chat interface, group chat messages corresponding to the group member ID.

Optionally, the outputting a selection interface to a user through a group chat interface includes: outputting the selection interface to the user through the group chat interface when an operation instruction of the user for a follow option that is provided in the group chat interface in advance is received.

Optionally, the displaying, in a preset manner in the group chat interface, group chat messages corresponding to the group member ID includes: highlighting, in the group chat interface, the group chat messages corresponding to the group member ID, and hiding user avatars of group members other than the group member corresponding to the group member ID.

Optionally, the highlighting, in the group chat interface, the group chat messages corresponding to the group member ID includes: highlighting, in the group chat interface, a group chat message that is among locally loaded group chat messages and corresponds to the group member ID; and highlighting, in the group chat interface, a group chat message that is among group chat messages received from a server and corresponds to the group member ID.

Optionally, the method further includes: sequentially centering the highlighted group chat messages in the group chat interface when the operation instruction of the user for the follow option is received again after the group chat messages corresponding to the group member ID are highlighted in the group chat interface.

Optionally, the method further includes: outputting a recovery option to the user through the group chat interface after the group chat messages corresponding to the group member ID are highlighted in the group chat interface, where the recovery option is used for prompting the user to recover the group chat messages in the group chat interface to a default display manner; and recovering the highlighted group chat messages in the group chat interface to the default display manner when an operation instruction of the user for the recovery option is received, and unhiding the user avatars of other group members.

The present application further provides a group chat device, including: an output module configured to output a selection interface to a user through a group chat interface, where the selection interface is used for prompting the user to select, in the group chat interface, a group chat message of a target group member; an acquisition module configured to acquire a group member ID of the group chat message selected by the user through the selection interface; and a display module configured to display, in a preset manner in the group chat interface, group chat messages corresponding to the group member ID.

Optionally, the output module is specifically configured to: output the selection interface to the user through the group chat interface when an operation instruction of the user for a follow option that is provided in the group chat interface in advance is received.

Optionally, the display module is specifically configured to: highlight, in the group chat interface, the group chat messages corresponding to the group member ID, and hide user avatars of group members other than the group member corresponding to the group member ID.

Optionally, the display module is further configured to: highlight, in the group chat interface, a group chat message that is among locally loaded group chat messages and corresponds to the group member ID; and highlight, in the group chat interface, a group chat message that is among group chat messages received from a server and corresponds to the group member ID.

Optionally, the display module is further configured to: sequentially center the highlighted group chat messages in the group chat interface when the operation instruction of the user for the follow option is received again after the group chat messages corresponding to the group member ID are highlighted in the group chat interface.

Optionally, the output module is further configured to: output a recovery option to the user through the group chat interface after the group chat messages corresponding to the group member ID are highlighted in the group chat interface, where the recovery option is used for prompting the user to recover the group chat messages in the group chat interface to a default display manner; and the device further includes: a recovery module configured to recover the highlighted group chat messages in the group chat interface to the default display manner when an operation instruction of the user for the recovery option is received, and unhide the user avatars of other group members.

The present application further provides a group chat device, including: a processor; and a memory configured to store an instruction executable by the processor; where the processor is configured to: output a selection interface to a user through a group chat interface, where the selection interface is used for prompting the user to select, in the group chat interface, a group chat message of a target group member; acquire a group member ID of the group chat message selected by the user through the selection interface; and display, in a preset manner in the group chat interface, group chat messages corresponding to the group member ID.

Embodiments of the disclosure output, to a user through a group chat interface, a selection interface for prompting the user to select a group chat message of a target group member. A group member ID of the group chat message selected by the user through the selection interface can be further acquired. And embodiments of the disclosure then display, in a preset manner in the group chat interface, the group chat messages corresponding to the group member ID, so that the group chat messages of the target group member selected by the user can be highlighted in the group chat interface during a group chat. Therefore, group chat experience of the user can be improved.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Terms used in the present application are merely for describing specific embodiments, instead of limiting the present application. Singular forms "a(n)," "said," and "the" used in the present application and the appended claims are also intended to include plural forms, unless other meanings are clearly specified in the context. It should be further understood that, the term "and/or" used in this text refers to and includes any or all possible combinations of one or more associated items listed.

It should be understood that, although terms such as "first," "second," and "third" may be used to describe various kinds of information in the present application, these kinds of information should not be limited to the terms. These terms are merely used to distinguish information of the same type from each other. For example, without departing from the scope of the present application, the first information may also be referred to as second information, and similarly, the second information may also be referred to as first information. Depending on the context, for example, the word "if" used herein may be interpreted as "when . . . ", "as . . . ", or "in response to the determination".

The present application is described below by exemplary embodiments in combination with several application scenarios.

Figure 1:
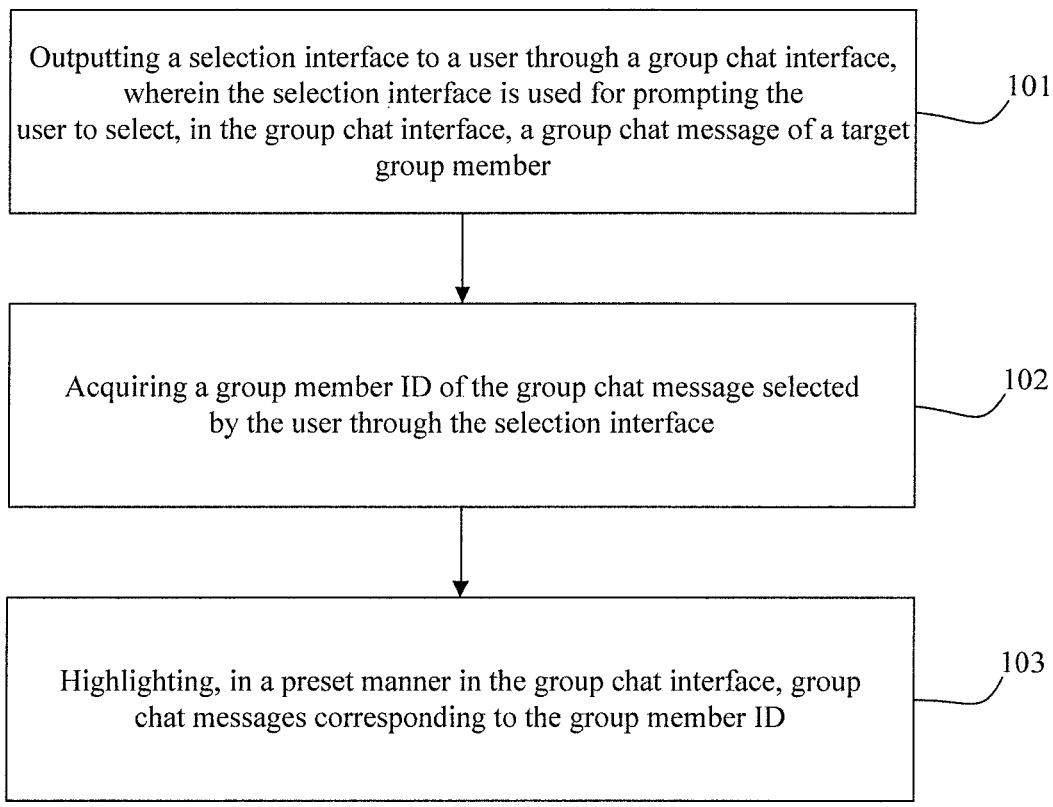
FIG. 1 is a flowchart of an exemplary group chat method, according to embodiments of the present application.

FIG. 1 is a group chat method according to embodiments of the present disclosure. The method may be performed by a terminal, and the terminal may be a smart phone, a tablet computer, a PC, a smart watch, or the like installed with an instant chat client (which is referred to as client for short hereinafter) supporting a group chat function. The method includes the following steps 101-103.

In step 101, a selection interface may be output to a user through a group chat interface. The selection interface is used for prompting the user to select, in the group chat interface, a group chat message of a target group member.

In some embodiments, a function switch may be provided for a user in the group chat interface in advance, to display a selection interface to the user through a group chat interface of a terminal.

Figure 2:
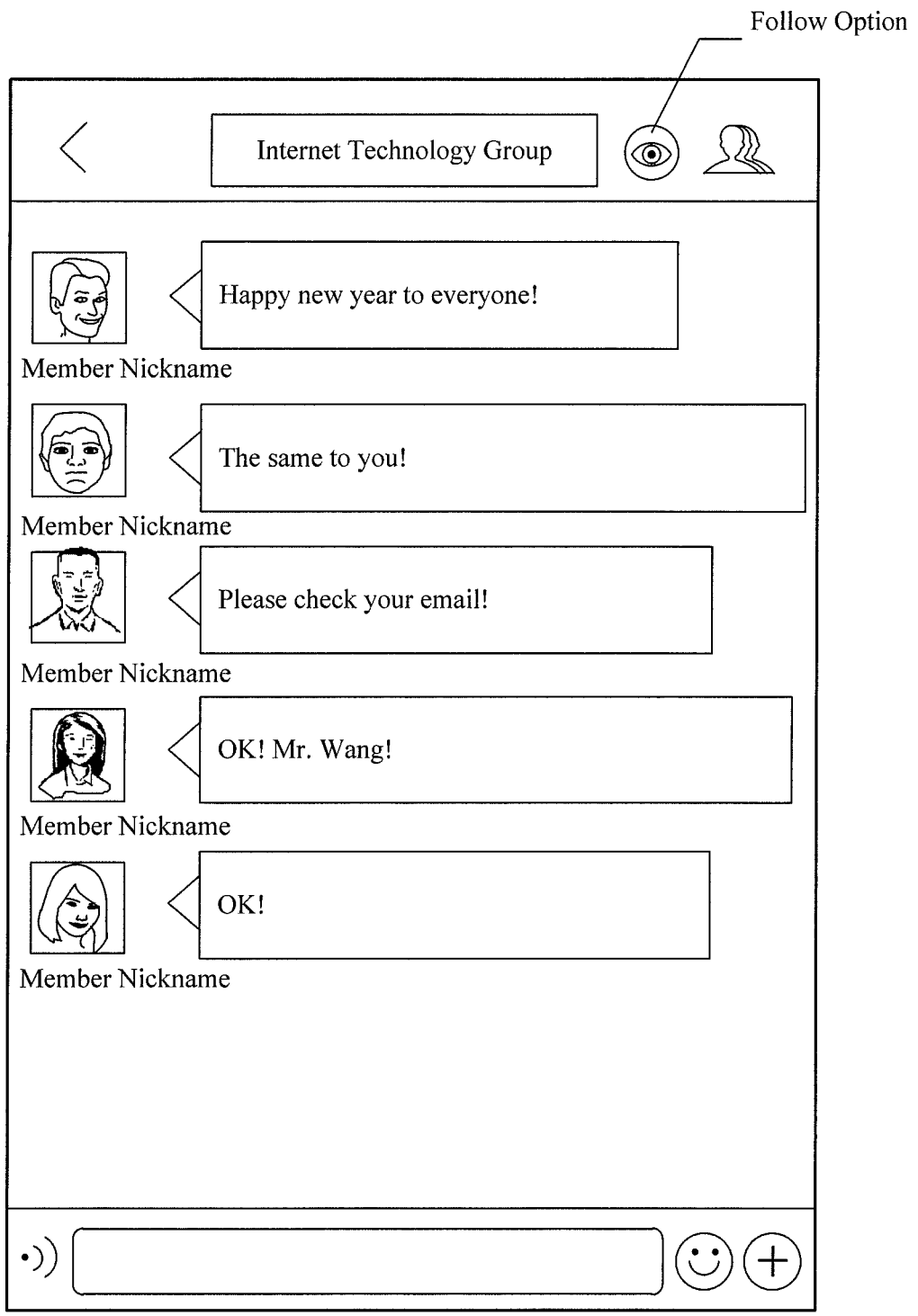
FIG. 2 is a schematic diagram of an exemplary group chat interface according, to embodiments of the present application.

FIG. 2 is a schematic diagram of a group chat interface according to embodiments of the disclosure.

During implementation, a follow option target may be provided for the user in the group chat interface in advance. The follow option can prompt the user to set a target group member. The user may click or touch the follow option to set the target group member. As shown in FIG. 2, the follow option is displayed as an eye icon (but it is appreciated that any icon can be used). After the user clicks or touches the follow option, the icon of the follow option may be transformed for differentiation. For example, the eye icon of the follow option may be changed to a check icon shown in FIG. 3.

In some embodiments, a touch screen mobile phone is used as an example of the terminal, and the user may touch a region having the follow option with a finger, to enable a function of setting a target group member. If a client detects a touch event of the user for the region having the follow option, the touch event triggers the client in the back-end to deliver an instruction for outputting the selection interface to the user through the group chat interface. And after receiving the instruction, the client outputs the selection interface in the group chat interface. As explained below, the selection interface allows the user to select one or more members of the group chat to more closely monitor.

With the selection interface generated in the group chat interface, the user may select, by operating the selection interface, a particular group chat message of the target group member according to the prompt of the selection interface. The follow option may be clicked or touched again after completing the selection to confirm the selection result.

Figure 3:
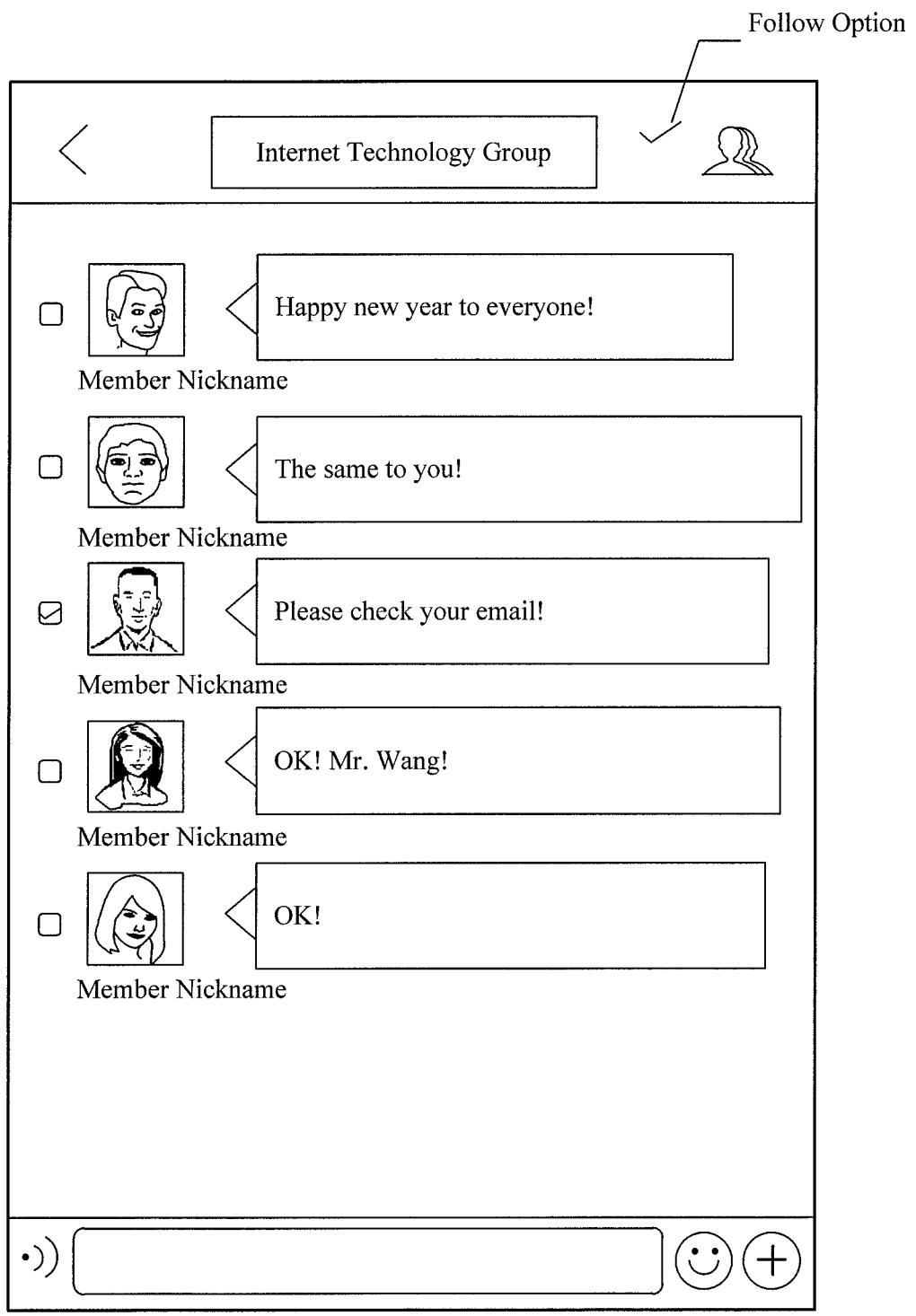
FIG. 3 is a schematic diagram of a selection interface according to an embodiment of the present application.

FIG. 3 is a schematic diagram of a selection interface according to embodiments of the disclosure.

In some embodiments, the selection interface may include several group chat messages. Once triggered, the selection interface provides a selection region in front of each group chat message. When selecting the target group member, the user may click or touch the selection region in the selection interface to select one or more group chat messages.

For example, a touch screen mobile phone is still used as an example of the terminal. When selecting the target group member, the user may touch a selection region in front of a group message of the group member in the selection interface with a hand. It is appreciated that other means for selecting the group member can be used such as via a pointer or a stylist. If the client detects a touch event of the user on the region, the touch event triggers the client in the back-end to deliver an instruction for adding a selected tag for the group chat message in the selection region. In some embodiments, a check mark may be added in front of the group chat message. After receiving the instruction, the client adds a selected tag for the group chat message. After completing the selection, the user may click the follow option again to confirm the selection result. At this point, the group chat message added with the selected tag is in a selected state, and a group member corresponding to the selected group chat message is the group member to be followed by the user.

With reference back to FIG. 1, in step 102, a group member identification (ID) of the group chat message selected by the user through the selection interface may be acquired.

In some embodiments, after the user selects the group chat message of the target group member through the selection interface, the client may identify a group member ID corresponding to the selected group message in the back-end. For example, the group member ID may be account information of a group member when using the client.

In some embodiments, all group chat messages selected by the user through the selection interface may be messages that have been loaded locally by the client. As a group chat message can be pushed by a server cooperating with the client, the group chat message can carry a group member ID of a sender of the message. When the group message pushed by the server is received, the client may locally store a corresponding relationship between the group message and the group member ID of the sender of the message, so that the received group chat message is correctly and conveniently rendered into the group chat interface during a user group chat. Therefore, the client may directly search the stored corresponding relationship, and then can identify the group member ID corresponding to the selected group message in the back-end.

In step 103, group chat messages corresponding to the group member ID in the group chat interface may be highlighted.

In some embodiments, after the client successfully acquires the group member ID corresponding to the selected group chat message, the group member corresponding to the group member ID is the group member to be followed by the user during a group chat. For the group member to be followed by the user, in the subsequent group chat, group chat messages sent by the group member may be displayed in a preset manner in the group chat interface. For example, the group chat messages may be highlighted in the group chat interface to prompt the user.

A detailed description is provided below to illustrate an exemplary highlighting of the group chat messages in the group chat interface.

In some embodiments, group chat messages in a group chat generally include group chat messages that have been loaded locally by the client and latest group chat messages pushed by the server. Therefore, group chat messages that are finally highlighted in the group chat interface can include two kinds of message, such as the group chat messages that have been loaded locally by the client and the latest group chat messages pushed by the server of the target group member.

For group chat messages that have been loaded locally by the client, when a group message pushed by the server is received, the client may generally locally store a corresponding relationship between the group message and a group member ID of a sender of the message. Therefore, the client may directly query the stored corresponding relationship, and can screen out a group chat message of the target group member from the locally loaded group chat messages according to the acquired group member ID corresponding to the selected group chat message, and then highlight the group chat message.

For latest group chat messages received by the client, the client may match a group member ID in the group chat message with the group member ID of the target group member after receiving a group chat message pushed by the server. If the group member ID in the group chat message matches the group member ID of the target group member, the client may directly highlight the group chat message in the group chat interface.

In such embodiments, during a group chat, a group chat message of a group member and an avatar of the group member are generally displayed in an associated manner in the group chat interface. Therefore, to achieve a better prompt effect, when the group chat message of the target group member is highlighted in the group chat interface, avatars of group members other than the target group member may be hidden in the current group chat interface.

Figure 4:
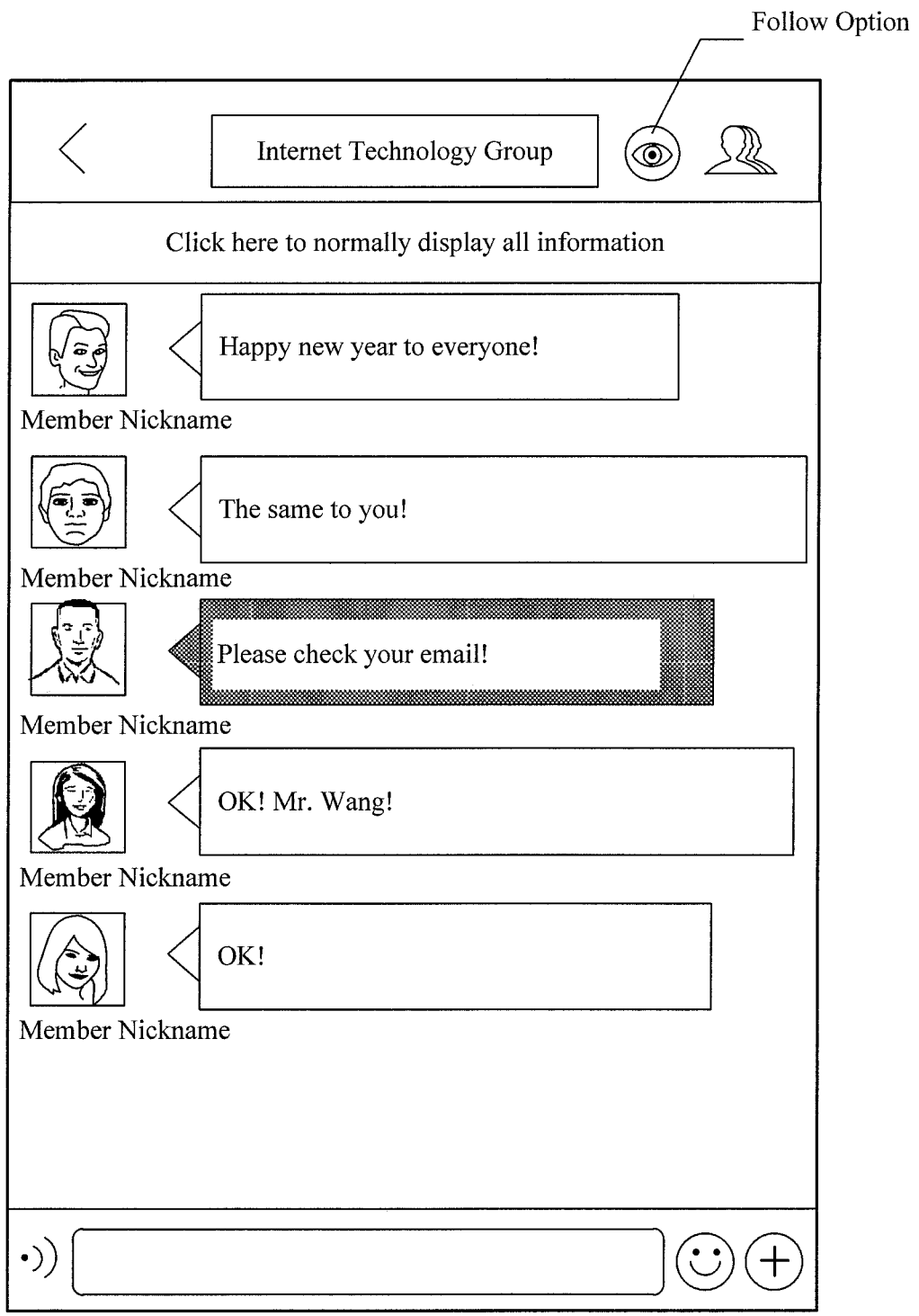
FIG. 4 is a schematic diagram of highlighting a group chat message in a group chat interface according to an embodiment of the present application.

For example, referring to FIG. 4, the group chat interface shown in FIG. 4 includes five group chat messages, and the third group chat message is a group chat message of the group member to be followed by the user. Therefore, to achieve a better prompt effect, the third group chat message may be highlighted, and user avatars associated with other group chat messages are hidden, thereby achieving a strong contrast effect, thus emphasizing the group chat message of the target group member in the group chat interface.

In some embodiments, when the group chat message of the target group member is highlighted in the group chat interface, avatars of group members other than the target group member may not be hidden, which is not specifically limited in this embodiment.

After the group chat message of the group member to be followed by the user is highlighted in the group chat interface, the user may scroll the current group chat interface, to view historical group chat messages sent by the group member. To make it more convenient for the user to view historical group chat messages of the target group member, in addition to scrolling the current group chat interface, the user may also view the historical group chat messages by means of jumping.

In some embodiments, the follow option that is provided for the user in the group chat interface may be used as a function option for jumping to the previous highlighted historical message. For example, a touch screen mobile phone is still used as an example of the terminal. The user may touch the region having the follow option with a finger, to enable a function of jumping to the previous highlighted historical message. And when the client monitors in the back-end a touch event of the user for the region having the follow option, a deliver instruction is triggered in the back-end for jumping to the previous highlighted historical message. After the instruction is received, the client may acquire coordinates of a center position in the current group chat interface, and display the previous highlighted historical message at the center position of the group chat interface by means of jumping. Similarly, when the client further monitors in the back-end the touch event of the user for the region having the follow option, jumping may be performed again in the foregoing manner. And finally, the user may touch the follow option to sequentially display the highlighted historical messages at the center position of the group chat interface by means of jumping. In this way, the user may continuously touch the region having the follow option, to view the highlighted historical messages one by one.

In some embodiments, it is also possible to provide a new function option, instead of using the follow option as a function option for enabling a jump to the previous highlighted historical message. This is not specifically limited in this embodiment.

After the group chat messages of the target group member are highlighted in the group chat interface, a recovery option for prompting the user to recover the group chat messages in the group chat interface to a default display manner may further be provided for the user in the group chat interface. The user may recover the highlighted group chat messages to the default display manner by operating the recovery option, and unhide the avatars of the group members in the group chat interface.

With reference back to FIG. 4, a touch screen mobile phone is still used as an exemplary terminal. After the group chat messages of the target group member are highlighted in the group chat interface, a recovery option "click here to normally display all information" may be output at the top of the group chat interface. The user may touch a region having the recovery option with a finger, so as to recover the highlighted group chat messages to a default display manner, and unhide the avatars of other group members in the group chat interface. When the client monitors, in the back-end, a touch event of the user for the region where the recovery option is located, a deliver instruction is triggered in the back-end for recovering the highlighted group chat messages to the default display manner and unhiding the avatars of the group members in the group chat interface. After the instruction is received, the client recovers the highlighted group chat messages to the default display manner, and unhides the avatars of other group members in the group chat interface. Therefore, the group chat messages in the group chat interface are recovered to the default display manner.

In the above embodiments, a group chat experience for the user has been improved. As shown above, the group chat embodiments described herein output, to a user through a group chat interface, a selection interface for prompting the user to select, in the group chat interface, a group chat message of a target group member. The group chat embodiments described herein also acquire a group member ID of the group chat message selected by the user through the selection interface, and then highlights, in the group chat interface, group chat messages corresponding to the group member ID, the group chat messages of the target group member selected by the user can be highlighted in the group chat interface during a group chat.

Corresponding to the foregoing method embodiment, the present application further provides an embodiment of an device.

Figure 5:
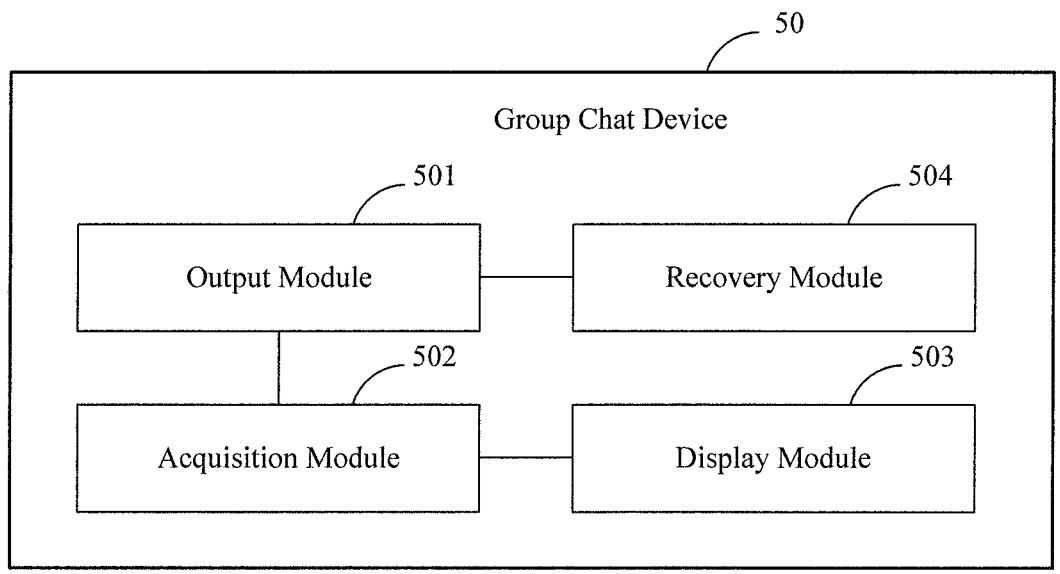
FIG. 5 is a logic block diagram of a group chat device according to an embodiment of the present application.
Figure 6:
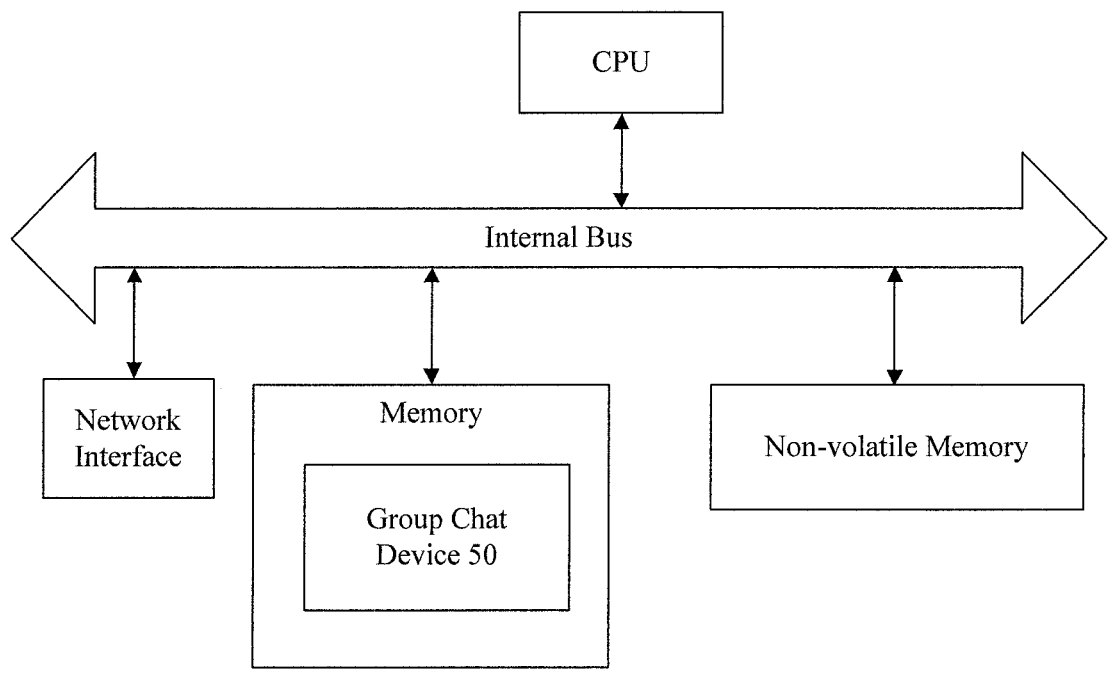
FIG. 6 is a hardware structural diagram of a terminal that carries the group chat device according to an embodiment of the present application.

Referring to FIG. 5, the present disclosure further provides a group chat device 50 applied to a terminal. The terminal may be a smart phone, a tablet computer, a PC, a smart watch, or the like installed with instant chat software supporting a group chat function. The group chat device 50 may be construed as instant chat software supporting a group chat function and installed on the terminal. Referring to FIG. 6, a hardware architecture related to a terminal carrying the group chat device 50 generally includes a CPU, a memory, a non-volatile memory, a network interface, an internal bus, and the like. Using software implementation as an example, the group chat device 50 may be generally construed as a software-hardware combined logic device formed after a computer program loaded in the memory is run by the CPU. The device 50 includes: an output module 501, an acquisition module 502, and a display module 503.

Output module 501 may be used to output a selection interface to a user through a group chat interface, wherein the selection interface is used for prompting the user to select, in the group chat interface, a group chat message of a target group member.

Acquisition module 502 may be used to acquire a group member ID of the group chat message selected by the user through the selection interface.

Display module 503 may be used to display, in a preset manner in the group chat interface, group chat messages corresponding to the group member ID.

In general, the word "module," as used herein, can be a packaged functional hardware unit designed for use with other components (e.g., portions of an integrated circuit) or a part of a program (stored on a computer readable medium) that performs a particular function of related functions. The module can have entry and exit points and can be written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware modules can be comprised of connected logic units, such as gates and flip-flops, and/or can be comprised of programmable units, such as programmable gate arrays or processors. Generally, the modules described herein refer to logical modules that can be combined with other modules or divided into sub-modules despite their physical organization or storage.

In this embodiment, output module 501 is further configured to: output the selection interface to the user through the group chat interface when an operation instruction of the user for a follow option that is provided in the group chat interface in advance is received.

In this embodiment, display module 503 is configured to: highlight, in the group chat interface, the group chat messages corresponding to the group member ID, and hide user avatars of group members other than the group member corresponding to the group member ID.

In this embodiment, display module 503 is further configured to: highlight, in the group chat interface, a group chat message that is among locally loaded group chat messages and corresponds to the group member ID; and highlight, in the group chat interface, a group chat message that is among group chat messages received from a server and corresponds to the group member ID.

In this embodiment, display module 503 is further configured to: sequentially center the highlighted group chat messages in the group chat interface when the operation instruction of the user for the follow option is received again after the group chat messages corresponding to the group member ID are highlighted in the group chat interface.

In this embodiment, output module 501 is further configured to: output a recovery option to the user through the group chat interface after the group chat messages corresponding to the group member ID are highlighted in the group chat interface, where the recovery option is used for prompting the user to recover the group chat messages in the group chat interface to a default display manner.

The device further includes a recovery module 504.

Recovery module 504 may be configured to recover the highlighted group chat messages in the group chat interface to the default display manner when an operation instruction of the user for the recovery option is received, and unhide the user avatars of other group members.

The present application further provides an embodiment of a group chat device.

The device includes: a processor; and a memory configured to store an instruction executable by the processor. Memory can include a tangible and/or non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive and/or flash memory, processor cache, memory register, or a semiconductor memory.

Further, the device may further include an input/output interface, a network interface, various kinds of hardware, and the like.

The processor is configured to: output a selection interface to a user through a group chat interface, where the selection interface is used for prompting the user to select, in the group chat interface, a group chat message of a target group member; acquire a group member ID of the group chat message selected by the user through the selection interface; and display, in a preset manner in the group chat interface, group chat messages corresponding to the group member ID.

Those skilled in the art can easily derive other implementations of the present application after considering the specification and practicing the invention disclosed herein. The present application is intended to cover any variations, applications, or adaptive changes of the present application, and these variations, applications or adaptive changes follow general principles of the present application and include common general knowledge or conventional technical measures in the technical field that are not disclosed in the present application. The specification and embodiments are considered as merely exemplary, and the real scope and spirit of the present application are indicated by the following claims.

It should be understood that the present application is not limited to precise structures that have been described above and shown in the accompanying drawings, and can have various modifications and variations without departing from the spirit thereof. The scope of the present application is merely limited by the appended claims.

The above descriptions are merely preferred embodiments of the present application, and are not intended to limit the present application. Any modification, equivalent replacement and improvement made without departing from the spirit and principle of the present application shall fall within the protection scope of the present application.

What is claimed is:

1. A method implemented by a group chat application running on a terminal device, comprising:
    displaying, in a group chat interface, group chat messages sent by a plurality of group chat members and a follow option;
    outputting a selection interface through the group chat interface when a first user operation on the follow option is received, wherein the selection interface prompts a user to select from a checkbox selection region provided in front of each of the group chat messages, in the group chat interface, a group chat message of a target group member from the plurality of group chat members;
    acquiring a group member identification (ID) of the group chat message selected by the user through the selection interface after a second user operation on the follow option is received; and
    displaying, in the group chat interface, group chat messages corresponding to the group member ID;
    wherein displaying the group chat messages corresponding to the group member ID comprises:
        hiding user avatars of group members other than the group member corresponding to the group member ID;
        displaying, at a predetermined area of the group chat interface, a current group chat message corresponding to the group member ID; and
        in response to detecting one or more further user operations after the second user operation on the follow option, for each of the detected one or more further user operations after the second user operation on the follow option, jumping to a previous group chat message sequentially one by one, wherein each of the previous group chat messages corresponds to the group member ID, wherein the jumping scrolls the group chat interface such that the previous group message jumped to is displayed at a center position of the group chat interface.

2. The method according to claim 1, wherein displaying the group chat messages corresponding to the group member ID further comprises:
    highlighting, in the group chat interface, the group chat messages corresponding to the group member ID.

3. The method according to claim 2, wherein highlighting, in the group chat interface, the group chat messages corresponding to the group member ID comprises:
    highlighting, in the group chat interface, a group chat message among locally loaded group chat messages; and
    highlighting, in the group chat interface, a group chat message that is among group chat messages received from a server.

4. The method according to claim 2, further comprising:
    displaying a recovery option in the group chat interface after the group chat messages corresponding to the group member ID are highlighted in the group chat interface, wherein the recovery option is used for prompting the user to recover the group chat messages in the group chat interface; and
    recovering the highlighted group chat messages in the group chat interface to the default display manner when a user operation on the recovery option is received, and unhiding the user avatars of other group members.

5. A group chat device, comprising:
    an output module, implemented by a processor, configured to:

display, in a group chat interface, group chat messages sent by a plurality of group chat members and a follow option; and output a selection interface through the group chat interface when a first user operation on a follow option is received, wherein the selection interface prompts a user to select, in the group chat interface from a checkbox selection region provided in front of each of the group chat messages, a group chat message of a target group member from the plurality of group chat members;

an acquisition module, implemented by the processor, configured to acquire a group member ID of the group chat message selected by the user through the selection interface after a second user operation on the follow option is received; and a display module, implemented by the processor, configured to:

hide user avatars of group members other than the group member corresponding to the group member ID;

display, in the group chat interface, group chat messages corresponding to the group member ID;

display, at a predetermined area of the group chat interface, a current group chat message corresponding to the group member ID; and in response to detecting one or more further user operations after the second user operation on the follow option, for each of the detected one or more further user operations after the second user operation on the follow option, jump to a previous group chat message sequentially one by one, wherein each of the previous group chat messages corresponds to the group member ID, wherein the jump scrolls the group chat interface such that the previous group message jumped to is displayed at a center position of the group chat interface.

6. The device according to claim 5, wherein the display module, implemented by the processor, is further configured to:

highlight, in the group chat interface, the group chat messages corresponding to the group member ID.

7. The device according to claim 6, wherein the display module, implemented by the processor, is further configured to:

highlight, in the group chat interface, a group chat message among locally loaded group chat messages; and highlight, in the group chat interface, a group chat message that is among group chat messages received from a server.

8. The device according to claim 6, wherein:

the output module, implemented by the processor, is further configured to display a recovery option in the group chat interface after the group chat messages corresponding to the group member ID are highlighted in the group chat interface, wherein the recovery option is used for prompting the user to recover the group chat messages in the group chat interface; and the device further comprises a recovery module implemented by the processor, the recovery module being configured to recover the highlighted group chat messages in the group chat interface to the default display manner when a user operation on the recovery option is received, and unhide the user avatars of other group members.

9. A group chat device, comprising:
a processor; and
a memory configured to store an instruction executable by the processor;

wherein the processor is configured to cause the group chat device to:

display, in a group chat interface, group chat messages sent by a plurality of group chat members and a follow option;

output a selection interface through the group chat interface when a first user operation on a follow option is received, wherein the selection interface prompts a user to select from a checkbox selection region provided in front of each of the group chat messages, in the group chat interface, a group chat message of a target group member from the plurality of group chat members;

acquire a group member ID of the group chat message selected by the user through the selection interface after a second user operation on the follow option is received;

hide user avatars of group members other than the group member corresponding to the group member ID;

display, in the group chat interface, group chat messages corresponding to the group member ID;

display, at a predetermined area of the group chat interface, a current group chat message corresponding to the group member ID; and in response to detecting one or more further user operations after the second user operation on the follow option, for each of the detected one or more further user operations after the second user operation on the follow option, jump to a previous group chat message sequentially one by one, wherein each of the previous group chat messages corresponds to the group member ID, wherein the jump scrolls the group chat interface such that the previous group message jumped to is displayed at a center position of the group chat interface.

10. A non-transitory computer readable medium that stores a set of instructions that is executable by at least one processor of a group chat device to cause the device to perform a group chat method, the method comprising:

displaying, in a group chat interface, group chat messages sent by a plurality of group chat members and a follow option;

outputting a selection interface through the group chat interface when a first user operation on a follow option is received, wherein the selection interface prompts a user to select from a checkbox selection region provided in front of each of the group chat messages, in the group chat interface, a group chat message of a target group member from the plurality of group chat members;

acquiring a group member ID of the group chat message selected by the user through the selection interface after a second user operation on the follow option is received; and displaying, in the group chat interface, group chat messages corresponding to the group member ID, wherein displaying the group chat messages corresponding to the group member ID comprises:

hiding user avatars of group members other than the group member corresponding to the group member ID;

displaying, at a predetermined area of the group chat interface, a current group chat message corresponding to the group member ID; and in response to detecting one or more further user operations after the second user operation on the follow option, for each of the detected one or more further user operations after the second user operation on the follow option, jumping to a previous group chat message sequentially one by one, wherein each of the previous group chat messages corresponds to the group member ID, wherein the lumping scrolls the group chat interface such that the previous group message jumped to is displayed at a center position of the group chat interface.

11. The non-transitory computer readable medium according to claim 10, wherein displaying the group chat messages corresponding to the group member ID further comprises:

highlighting, in the group chat interface, the group chat messages corresponding to the group member ID.

12. The non-transitory computer readable medium according to claim 11, wherein the group chat messages corresponding to the group member ID comprises:

a group chat message among locally loaded group chat messages; and a group chat message that is among group chat messages received from a server.

13. The non-transitory computer readable medium according to claim 11, wherein the set of instructions is executable by the at least one processor of the device to cause the device to further perform:

displaying a recovery option in the group chat interface after the group chat messages corresponding to the group member ID are highlighted in the group chat interface, wherein the recovery option is used for prompting the user to recover the group chat messages in the group chat interface; and recovering the highlighted group chat messages in the group chat interface to the default display manner when a user operation on the recovery option is received, and unhiding the user avatars of other group members.

* * * * *